(12) United States Patent
Choi et al.

(10) Patent No.: US 7,570,757 B1
(45) Date of Patent: Aug. 4, 2009

(54) TILT MECHANISM FOR COMMUNICATION DEVICE

(75) Inventors: Jae Hong Choi, Westminister, CO (US); James Erin Evans, Brighton, CO (US); Mark Dee Woolley, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 495 days.

(21) Appl. No.: 11/534,081

(22) Filed: Sep. 21, 2006

(51) Int. Cl.
*H04M 1/00* (2006.01)
*H04M 9/00* (2006.01)

(52) U.S. Cl. .................... 379/428.04; 379/446; 379/454

(58) Field of Classification Search ............ 379/428.01, 379/428.04, 441, 446, 447, 454; 248/444, 248/455, 460
See application file for complete search history.

(56) References Cited

OTHER PUBLICATIONS

Applicant's Admitted Prior Art: that the embodiment shown in Figures 1-2 were publicly used, sold, offered for sale or otherwise publicly disclosed more than one year prior to the filing date of this application.

*Primary Examiner*—Tuan D Nguyen
(74) *Attorney, Agent, or Firm*—Sheridan Ross P.C.

(57) ABSTRACT

A tilt mechanism is provided for a communication device enabling the communication device to be placed at a desired angular position during use. The tilt mechanism includes a biasing member that allows the user to consistently and easily set the angular position of the phone and without collapse or shifting of the communication device to another position. In the preferred embodiments, the biasing member is in the form of a leaf spring that biases the movement of a user-controlled component for setting the desired angular position.

20 Claims, 5 Drawing Sheets

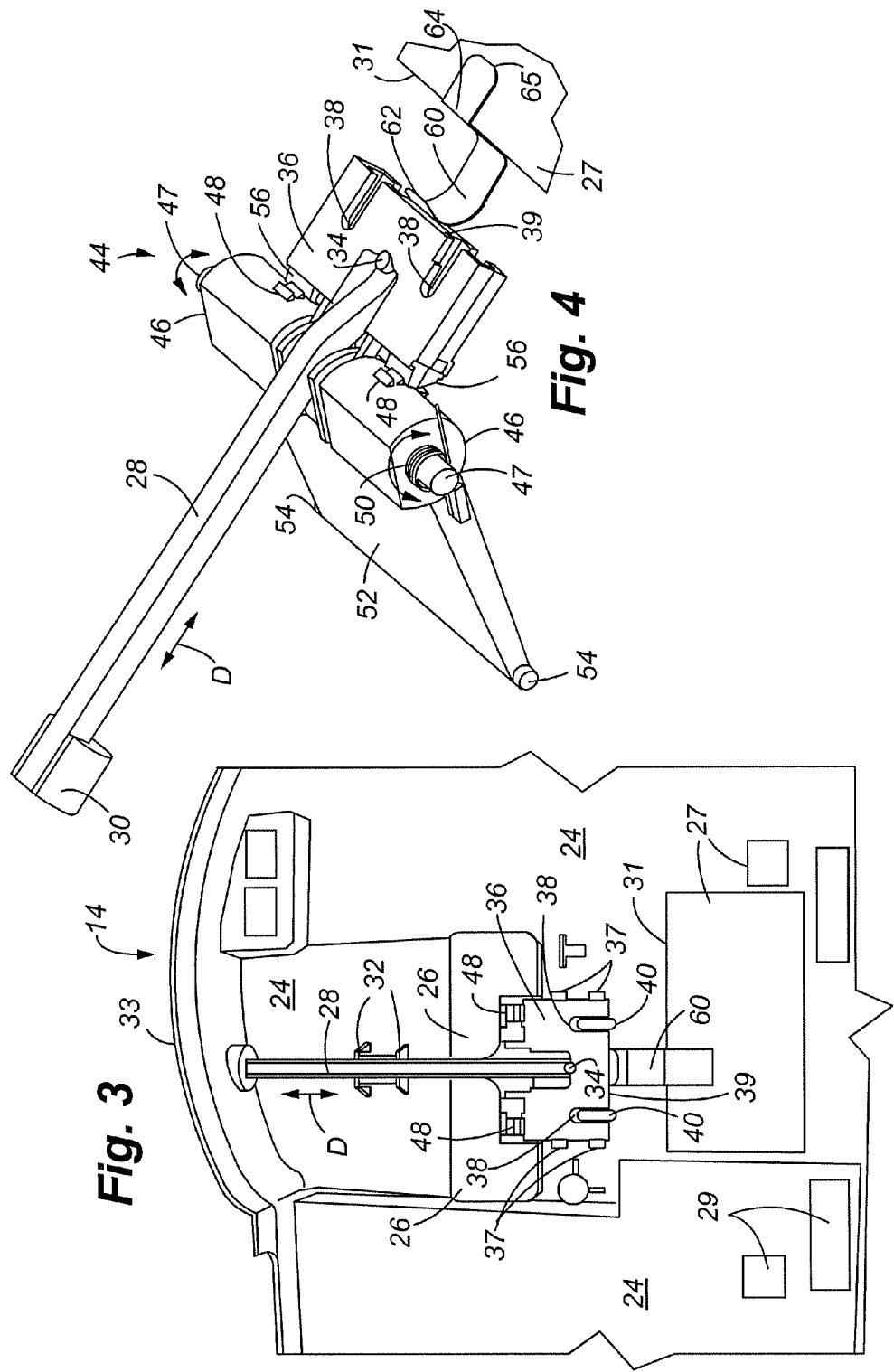

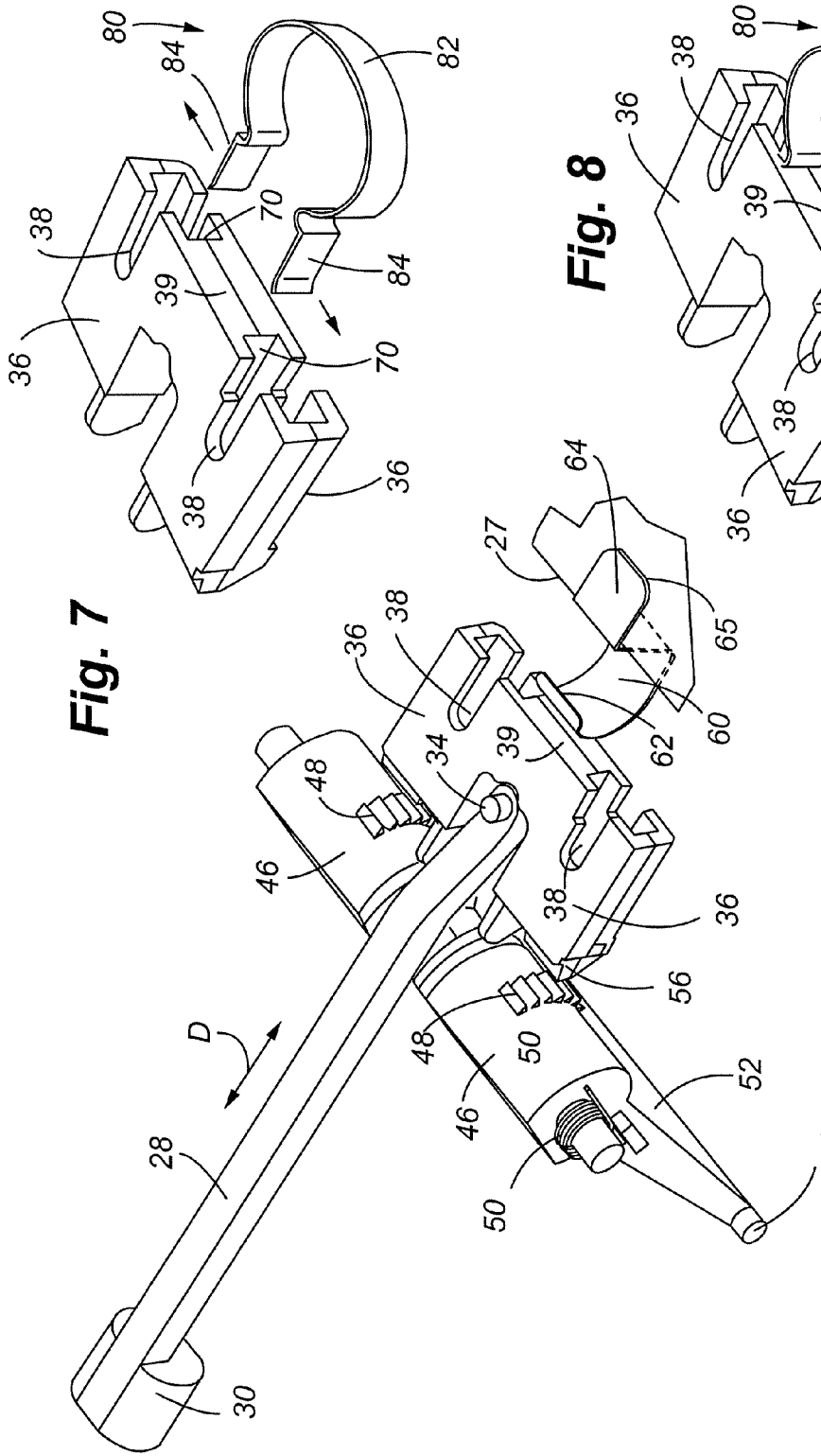
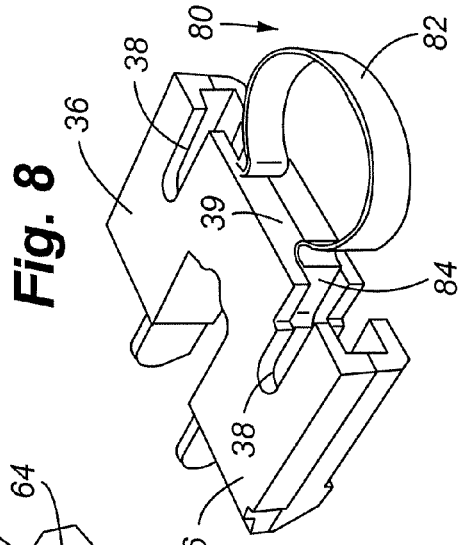
Fig. 6
Fig. 7
Fig. 8

TILT MECHANISM FOR COMMUNICATION DEVICE

FIELD OF THE INVENTION

The present invention relates to a mechanism to adjust the angular position of a device, and more particularly, to an adjustable tilt mechanism for adjusting the angular position of a communication device such as a desktop telephone.

BACKGROUND OF THE INVENTION

For devices such as telephones, PDAs, and computers, it is desirable to provide a mechanism that allows a user to adjust the height and/or angle at which the device is positioned for use. The visual display for a conventional desktop telephone or other communication device may need to be placed at a particular angle so that the user can view the display without glare or to otherwise maximize visibility. In the case of a desktop telephone, the visual display may be provided within a single housing along with the telephone keypad. In the case of a laptop computer, the screen of the laptop computer rotates independently of the keyboard; however, the screen must be placed at a particular angle so that the user may best view the screen. With respect to other communication devices such as PDAs, one or more keypad controls are co-located with a screen display, and viewability of the screen is maximized at a particular angular position.

Providing a reliable mechanism to select and set the angle of the device is important in enabling the user to effectively use the device. Particularly for devices such as desktop telephones, the angle at which the telephone display is set is important since the telephone display may not be particularly bright or large, and any misalignment of the display may make viewing very difficult.

Mechanisms to control the angle at which a desktop telephone is placed have been provided in various forms. One prior art mechanism for providing an adjustable angle is a ratchet tilt mechanism. This mechanism enables a user to select a particular angular orientation for the telephone display through a ratcheting feature incorporated in the housing of the telephone.

While the ratchet tilt mechanism may be commonly used in many desktop telephones, adjustment components like the ratchet feature can be unreliable and often fail immediately after assembly or after the telephone has been in use for only a short time. Furthermore, many tilt mechanisms do not allow the user to easily adjust fine positioning of the angle of the telephone display, and therefore are not user-friendly.

Therefore, there is a need to provide a mechanically simple, yet reliable tilt mechanism to enable the user to easily adjust and set the angle at which a device is to be used.

SUMMARY OF THE INVENTION

In accordance with the present invention, a tilt mechanism is provided for adjustably positioning the angle at which a device such as a desktop telephone is placed with respect to a horizontal surface on which a base of the telephone rests. The tilt mechanism includes an improved biasing member that helps to ensure the tilt mechanism holds its selected position, as well as easing the manner in which the user selects a particular position.

The tilt mechanism of the present invention allows a user to select the angular position of the communication device with use of a conventional push button feature and without forcing the user to adjust any other part of the device.

In one aspect of the invention, it can be considered a communication device incorporating the tilt mechanism. In another aspect of the invention, it can be considered a tilt mechanism with potential use with a communication device and many other types of devices that may require positioning at a desired angle. In another aspect of the invention, a useful sub-combination is provided wherein a tilt mechanism does not require a base, and the element that is used to incrementally adjust the angular position of the device can directly contact the surface upon which the device rests. In yet another aspect of the present invention, a method is provided for adjustably positioning the angle of one device with respect to a horizontal mounting surface, and more particularly, a method of adjustably positioning a housing of a communication device with respect to a base of the communication device that rests on the mounting surface.

These and other features and advantages of the present invention will become apparent from review of the following detailed description, taken in conjunction with the drawings.

BRIEF DESCRIPTION OF THE DRAWINGS

FIG. 3 is a fragmentary perspective view of the tilt mechanism of the present invention installed in the housing of the communication device;

FIG. 4 is an enlarged fragmentary perspective view of the tilt mechanism of the present invention, showing the mechanism in a locked position;

FIG. 6 is yet another perspective view of the tilt mechanism of the present invention illustrating the tilt mechanism in the unlocked position;

FIG. 7 is a greatly enlarged perspective view of a tilt block incorporating a return spring in a second embodiment of the tilt mechanism of the present invention;

FIG. 8 is another perspective view illustrating the return spring installed in the tilt block.

DETAILED DESCRIPTION

Figure 1:
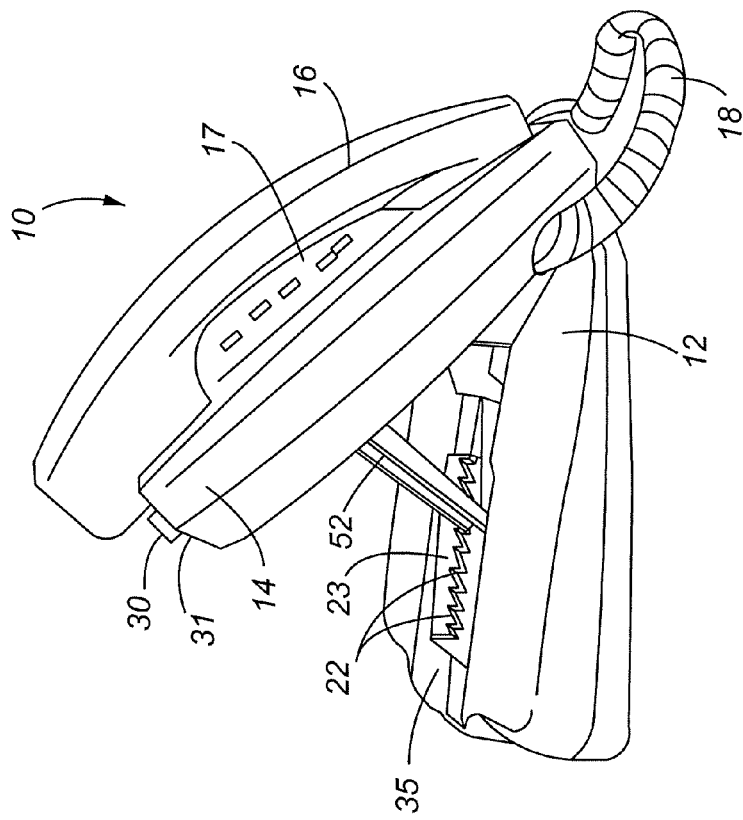
FIG. 1 is a perspective view of a conventional communication device in the form of a desktop telephone, including a mechanism for adjusting the angle of the communication device with respect to a base placed on a horizontal surface.

FIG. 1 illustrates a conventional prior art communication device 10. Specifically, FIG. 1 illustrates a desktop telephone including a base 12, a housing 14, and a handset 16 mounted to the housing 14. A cord 18 interconnects the handset to the housing. A control panel 17 includes a plurality of keys enabling a user to dial the phone, as well as to conduct a number of other functions with the communication device. The control panel may also include one or more user screens (not shown) enabling the user to view a number of functions of the communication device.

The angular position of the housing 14 may be set by a tilt mechanism, as discussed further below. Components of the tilt mechanism seen in this Figure include a tilt foot or tilt support 52 having a first end that rotates about a fixed point in the housing 14, and a second end that is selectively placed within a desired setting between teeth 22 formed within channel 23. More specifically, a setting is defined as a selected gap located between two adjacent teeth 22.

Figure 2:
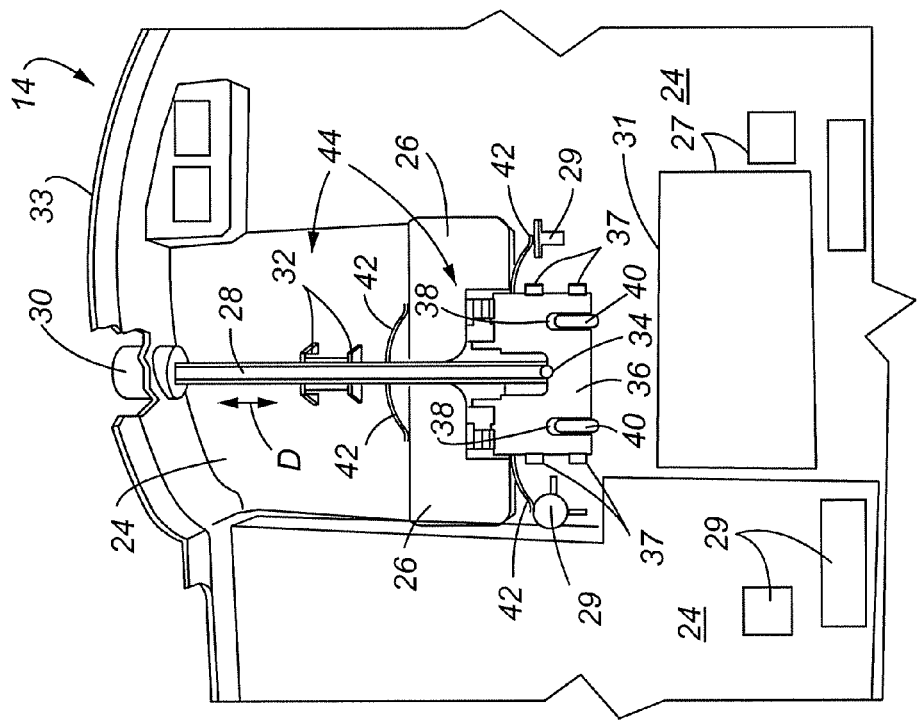
FIG. 2 is a fragmentary perspective view of internal components of the housing that are used to adjust the angled position of the housing.

FIG. 2 illustrates the interior of the housing 14 with interior components of the communication device removed for clarity, except for the tilt mechanism. The tilt mechanism of the present invention is similar to the prior art tilt mechanism 44, with the exception that different structure is used to bias the operation of the plunger rod 28, as discussed below. Therefore, for basic operation of the prior art tilt mechanism 44, reference can also be made to FIGS. 3-6, which illustrate the tilt mechanism of the present invention. Also, the same reference numbers used to describe the prior art denote the same or similar elements in the present invention.

With respect to the prior art tilt mechanism 44, it includes a user control including plunger rod 28 having an exposed plunger button 30 protruding from one side 33 of the housing. The underside 24 of the housing 14 includes various internal protruding features 26, 27 and 29 that are used to accommodate attachment of the communication device components and/or are provided to strengthen the housing and segregate components from one another. Brackets 32 support the plunger rod 28, and the opposite end of the plunger rod includes a contact tab 34 that engages a tilt block 36. The tilt block 36 is laterally secured by a plurality of tabs 37 that extend from the underside 24 of the housing. However, the tilt block is allowed to displace longitudinally by action of the plunger rod 28 in the directions D as shown. Slots 38 are formed in the tilt block. A pair of stop tabs 40 protrudes from the underside 24 of the housing. The tabs 40 are received in the slots 38. The stop tabs 40 delimit the longitudinal displacement of the tilt block. A plurality of cantilever springs 42 are used to bias the actuation of the plunger rod 28. Specifically, in FIG. 2, a first pair of cantilever springs 42 extend from and are integral with the plunger rod 28, while a second pair of cantilever springs 42 extend from and are integral with the tilt block. In the prior art, these cantilever springs are molded plastic members that are formed when the plunger rod and tilt block are injection molded. The first pair of cantilever springs 42 have free ends that press against the housing feature 26 that straddles the plunger rod, while the other pair of cantilever springs 42 have free ends that press against the other housing features 29 located laterally adjacent the tilt block 36. Protruding feature 26 partially covers the tilt mechanism 44 as seen from the view of FIG. 2.

Figure 5:
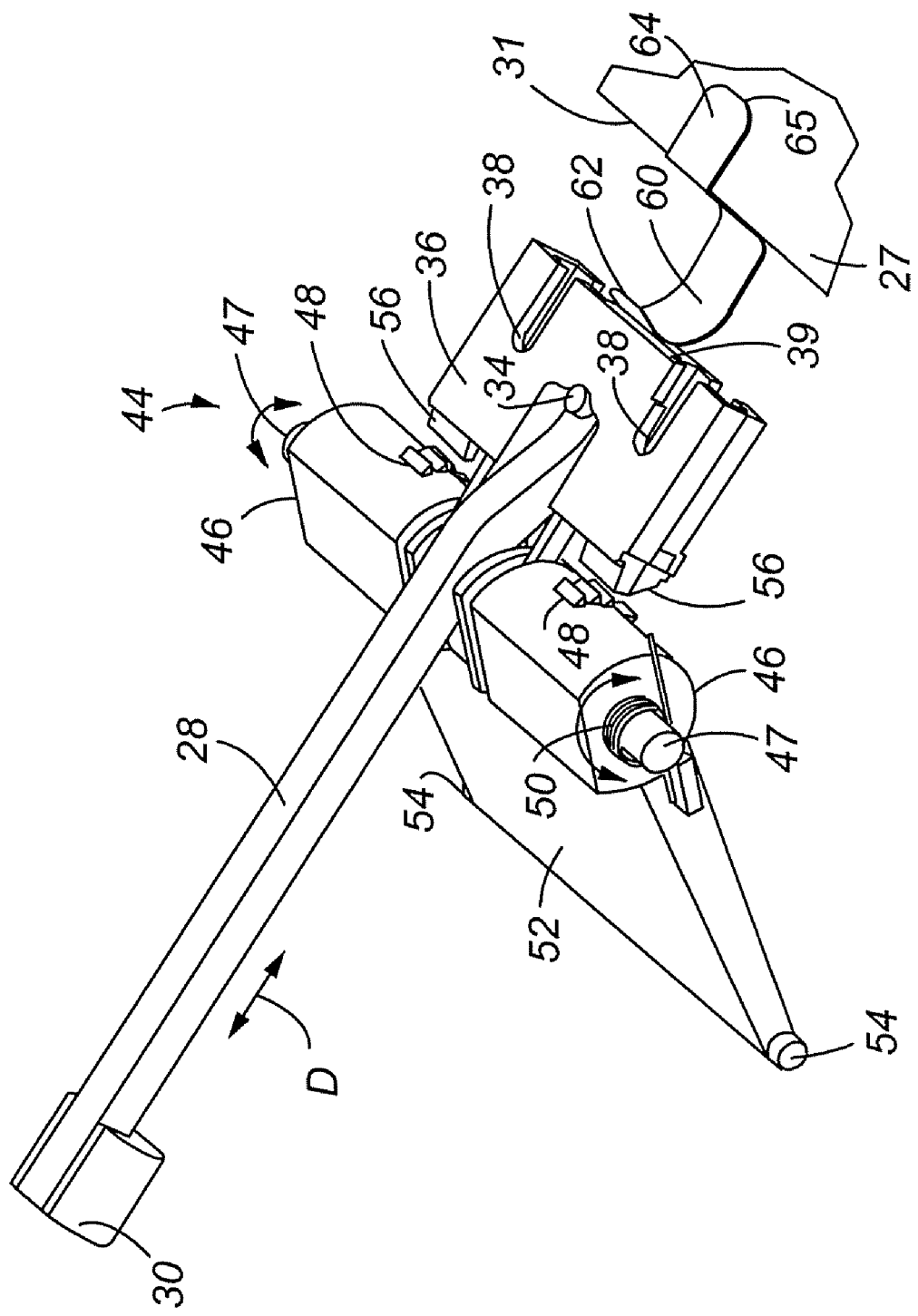
FIG. 5 is another enlarged fragmentary perspective view of the tilt mechanism illustrating the mechanism in an unlocked position.

Referring specifically to FIGS. 4 and 5 of the present invention for better understanding of how the tilt mechanism operates, the tilt mechanism 44 is shown in greater detail wherein the tilt block 36 includes a pawl 56 that selectively engages gaps between teeth 48 formed on ratchet drum 46. Ratchet drum 46 is mounted within the housing 14 by pins 47 that are rotatably mounted in the housing 14. A rotational spring 50 is provided on one or both of the pins 47 in order to provide some rotational bias for the ratchet 46. Integral with and extending from the ratchet 46 is the tilt foot 52. The second or free end of the tilt foot 52 includes extensions 54 that are selectively lodged within the desired setting, as discussed above with respect to FIG. 1.

Again referring to FIG. 1, when the housing 14 is moved to its most horizontal position with respect to base 12, the extensions 54 travel forward in the channel 23 towards the forward portion 35 of the base, and the tilt foot 52 then lies collapsed within the recess 23. If the user decides to create some angular inclination of the housing 14 with respect to the base 12, the user simply grasps the housing 14 and rotates the housing upwards until the desired inclination is obtained. As the housing 14 is rotated upwards, the extensions 54 travel across the teeth 22 until the extensions are lodged in the desired setting. Simultaneously, as the housing is rotated, the tilt mechanism 44 rotates about pins 47, and the teeth 48 sequentially contact the pawl 56 until rotation is stopped. Then the pawl 56 engages one of the incremental gaps between adjacent teeth 48. As the housing is rotated to the user's desired position, a distinct clicking noise is generated caused by the pawl 56 progressively advancing into each gap by the spring force generated from the cantilever springs 42 and rotational spring(s) 50. A distinct angular setting is available corresponding to each audible clicking sound. Springs 42 and spring(s) 50 provide some biasing force such that if the user releases the housing 14, the plunger 28 retracts and causes the pawl 56 to engage the aligned gap between teeth 48, thereby locking the housing 14 in its set position. If it is desired to place the housing 14 more towards a horizontal orientation with respect to the base 12, the user depresses the plunger button 30 causing the plunger 28 to travel so the contact tab 34 engages the tilt block 36 and displaces it so that the pawl 56 is separated from the ratchet 46 and the teeth 48. When the plunger button is depressed, the housing can be freely rotated with no engagement of the pawl against the ratchet.

One inherent drawback with respect to the prior art device of FIG. 2 is that the molded cantilever springs 42 relax over time, and crisp, clean selection of a particular setting is made much more difficult, since the biasing force provided by the cantilever springs 42 decrease over time, resulting in the pawl 56 failing to cleanly engage the gaps on the drum 46 between the teeth 48. Accordingly, a user may choose a particular angular setting, and the pawl 56 may fail to adequately engage the ratchet 46, resulting in the housing 14 collapsing back upon the base 12 or resulting in slippage of the pawl 56 and placement of the pawl in another gap between the teeth. Another disadvantage associated with the cantilever springs include inconsistency in performance based upon molding defects. Slight defects in the shape and location of the springs can result in substandard performance, and because the springs are relatively small, molding defects are common. Additionally, inconsistency in assembly of the tilt mechanism can contribute to substandard spring performance. If the plunger rod is not precisely positioned, one or more of the cantilever springs may not be placed in the correct position to press against the designated internal housing feature, thereby resulting in partial or complete loss of spring force at that misaligned location(s).

In accordance with the present invention, in order to overcome the disadvantages outlined above with respect to the prior art shown in FIG. 2, a different biasing member is provided to ensure that once the user has chosen the desired angular placement of the housing 14, the tilt mechanism does not fail causing the housing to shift or fall towards the base.

In a first embodiment, the biasing member of the present invention is shown in FIGS. 3 and 4 as a bumper spring 60 that is placed between the most distal or forward surface 39 of the tilt block 36 and a surface 31 of one of the internal features 27 formed on the underside of the housing. The bumper spring 60 has a first end 62 that abuts the distal surface 39, while a second end 64 engages the surface 31 of feature 27. The spring 60 also has an extension 65 that extends over the planar surface of the feature 27, thereby helping to retain the spring in place. Preferably, the bumper spring 60 is in the form of a leaf spring made of metal such as stainless steel. The leaf spring has a uniform width and thickness and is shaped to accommodate the space or gap between surfaces 31 and 39. The type of metal as well as the thickness and width of the spring can be chosen such that optimal force is placed against distal surface 39 in response to actuation by the user of the plunger rod 28, thus insuring a crisp, reliable engagement and disengagement of the pawl 56 with the ratchet 46 and the teeth 48. With use of a metallic spring, concerns regarding plastic relaxation are overcome, and the bumper spring is a much more efficient and reliable solution for biasing the movement of the plunger 28.

FIGS. 3 and 4 illustrate the tilt mechanism in the locked position wherein the pawl 56 is engages the ratchet 46. FIGS. 5 and 6 illustrate the tilt mechanism 36 in an unlocked position wherein the plunger 28 has been actuated by pressing the button 30 thereby displacing the tilt block 36 and causing the pawl 56 to disengage the ratchet 46. Accordingly, a small space is visible between the pawl 56 and the ratchet 46.

Figure 9:
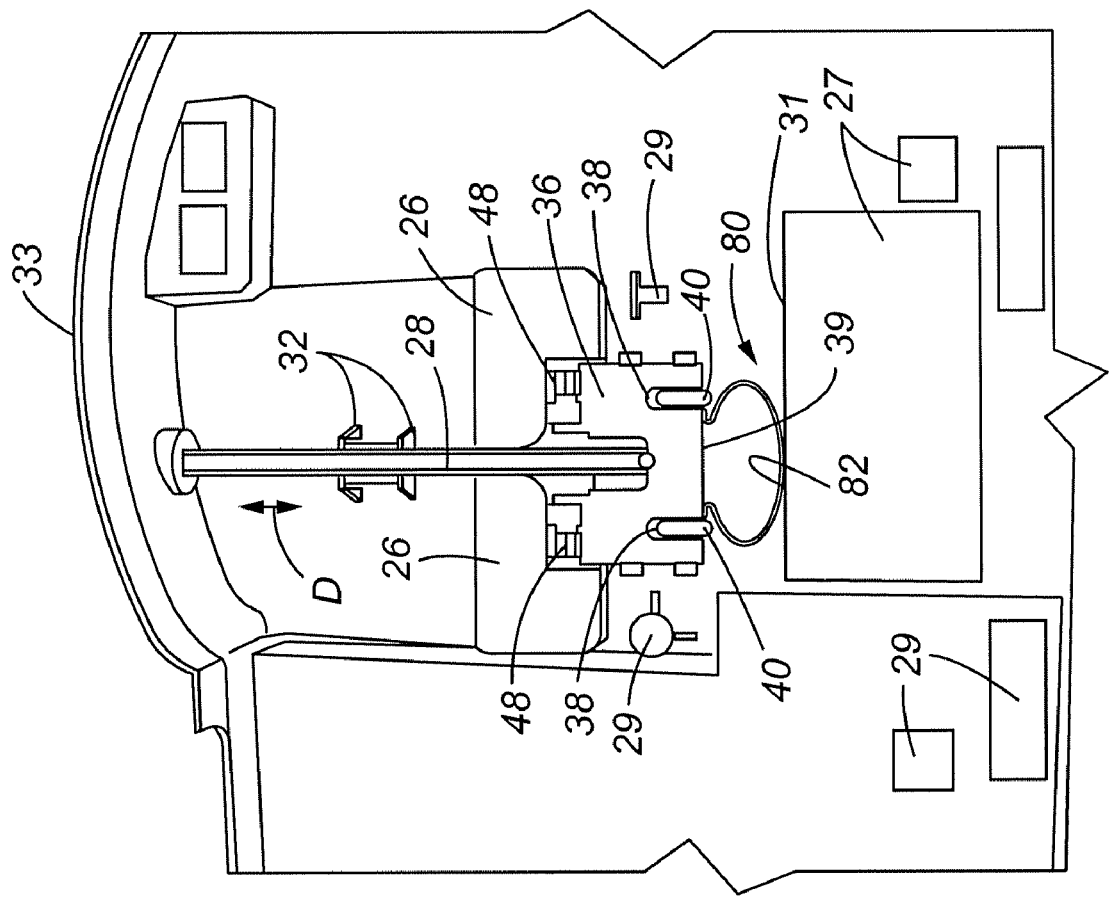
FIG. 9 is a perspective view of the second embodiment of the present invention illustrating the tilt block installed in the housing of the device.

Referring to FIGS. 7-9, a second embodiment of the present invention is shown. Specifically, in lieu of the bumper spring 60, a return spring 80 is provided. Referring first to FIG. 7, the return spring 80 is shown prior to assembly with the tilt block 36. The return spring 80 includes an elliptical shaped body 82, and a pair of spaced fingers 84. Referring to FIG. 8, fingers 84 are inserted within the respective slots 38, and are held in frictional engagement against interior planar edges 70. When installed, the spring fingers 84 are slightly spread so that adequate friction is maintained to hold the return spring in place. FIG. 9 shows the tilt block installed wherein the return spring 80 contacts the surface 31 of internal feature 27, thereby providing a biasing force against movement of the tilt block caused by plunger rod 28. The return spring 80 may also be selected such that the type of material and size of the spring results in an optimal biasing force.

With respect to both embodiments of the present invention, the only structural modifications necessary to the prior art communication device are elimination of the cantilever springs 42, and addition of the selected spring or biasing member 60 or 80. Therefore, the modified tilt mechanism of the present invention is provided in a structurally simple and cost-effective manner. The leaf spring configurations of springs 60 and 80 are reliable, and simply changing the width or thickness of the spring, or selection of a different material may easily modify an optimum biasing force.

In accordance with the method of the present invention, precise control of a tilt mechanism is achieved by compression of a spring 60, 80 whereby the pawl 56 reliably engages the ratchet 46 based on user control of the button 50. The method is achieved with existing components of the communication device, and does not require any further structural changes to the communication device as discussed above. The method also does not require any change in the general manner by which the user selects the angular position of the housing.

Although the present invention has been illustrated with respect to a conventional desktop telephone, it shall be understood that the tilt mechanism of the present invention can be used in a number of different types of communication devices, wherein the angle of the communication device with respect to a base is adjusted for user convenience. For example, in lieu of a desktop telephone, the tilt mechanism can be used with other communication devices such as personal digital assistants (PDAs) or computing devices having a soft or VOIP phone. Thus, it shall be understood that the housing 14 can be used to house not only a desktop telephone, but also other types of communication devices, and the base 12 can represent any structural member that helps stabilize the communication device on a horizontal surface.

While the present invention has been discussed with respect to one or more preferred embodiments, it shall be understood that various other changes and modifications of the invention can be made within the spirit and scope of invention, in accordance with the scope of the claims appended hereto.

What is claimed is:

1. A communication device, comprising:
  a housing;
  a communication element incorporated in said housing, said communication element comprising at least one of a telephone, a PDA, and a VOIP phone;
  a base rotatably mounted to said housing at one end thereof;
  a tilt mechanism incorporated in said housing, said tilt mechanism comprising:
    (i) a foot having a first end rotatably connected to said housing and a second end selectively placed in a set position within said base to place said housing in a desired angular position with respect to said base;
    (ii) a ratchet integral with said foot;
    (iii) a tilt block selectively engageable with said ratchet, said tilt block including a pawl that engages teeth formed on said ratchet;
    (iv) a plunger rod operatively connected to said tilt block for moving said tilt block between a locked and unlocked position, said locked position created by releasing said plunger rod causing said pawl to engage a selected gap between the teeth on said ratchet, said unlocked position created by activating said plunger causing separation of said tilt block from said ratchet thereby releasing said pawl from said ratchet; and
    (v) a spring placed between a distal surface of said tilt block and a feature incorporated in said housing, wherein said spring compresses to bias movement of said tilt block, thereby urging said tilt block to the locked position.

2. A communication device, as claimed in claim 1, wherein:
  said spring is a leaf spring.

3. A communication device, as claimed in claim 1, wherein:
  said spring has a first end that abuts said distal surface of said tilt block, and a second end that abuts said feature in said housing, said spring further including an extension that captures said second end of said spring against said feature.

4. A communication device, as claimed in claim 1, wherein:
  said spring comprises an elliptical shaped body, and a pair of spaced fingers extending away from said elliptical shaped body, wherein said pair of spaced fingers are inserted within respective slots of said tilt block, and are held in frictional engagement against interior planar edges defined by said respective slots.

5. A spring, as claimed in claim 1, wherein:
  said spring has a substantially uniform width and thickness.

6. A tilt mechanism especially to a communication device for adjusting the angular position of one element with respective to another element, said tilt mechanism comprising:
  a foot having a first end rotatably connected to the one element and a second end selectively placed in a set position within the other element in order to place the one element in a desired angular position with respect to the other element;

a ratchet integral with said foot;

a tilt block selectively engageable with said ratchet, said tilt block including a pawl that engages teeth formed on said ratchet;

a plunger rod operatively connected to said tilt block for moving said tilt block between a locked and unlocked position, said locked position created by releasing said plunger rod causing said pawl to engage a selected gap between the teeth on said ratchet, said unlocked position created by activating said plunger causing separation of said tilt block from said ratchet thereby releasing said pawl from said ratchet; and a spring placed between a distal surface of said tilt block and an external feature, wherein said spring compresses to bias movement of said tilt block, thereby urging said tilt block to the locked position.

7. A tilt mechanism, as claimed in claim 6, wherein:
said spring is a leaf spring.

8. A tilt mechanism, as claimed in claim 6, wherein:
said spring has a first end abutting said surface of said tilt block, and a second end that abuts said external feature, said spring further including an extension that captures said second end of said spring against said external feature.

9. A tilt mechanism, as claimed in claim 6, wherein:
said spring comprises an elliptical shaped body, and a pair of spaced fingers extending away from said elliptical shaped body, wherein said pair of spaced fingers are inserted within respective slots of said tilt block, and are held in frictional engagement against interior planar edges defined by said respective slots.

10. A tilt mechanism, as claimed in claim 6, wherein:
said spring has a substantially uniform width and thickness.

11. A method of adjustably positioning a housing of a communication device with respect to a base of the communication device, said method comprising:

providing a housing;
providing a communication element mounted in said housing;
providing a base rotatably connected to said housing;
providing a tilt mechanism comprising:
(i) a foot;
(ii) a ratchet integral with said foot;
(iii) a tilt block selectively engageable with said ratchet to place said housing in a desired angular position with respect to said base, said tilt block including a pawl that engages teeth formed on said ratchet;
(iv) a plunger rod operatively connected to said tilt block for moving said tilt block between a locked and unlocked position, said locked position defined by said pawl engaging a selected gap between teeth on said ratchet, and said unlocked position being defined by separation of said tilt block away from said ratchet, thereby releasing said pawl from said ratchet;
(v) a spring placed between a surface of said tilt block and a feature incorporated in said housing, said spring urging said tilt block to the locked position;

actuating the plunger rod to place the tilt block in the unlocked position;
rotating the housing to a desired angular position with respect to the base; and
releasing the plunger rod causing the tilt block to move to the locked position, thereby setting a position of the housing with respect to the base.

12. A method, as claimed in claim 11, further including:
compressing the spring in response to actuation of the plunger rod.

13. A method, as claimed in claim 11, further including:
decompressing the spring in response to release of the plunger rod.

14. In sub-combination, a tilt mechanism especially to a communication device for adjusting the angular position of an element with respective to the surface upon which the element is mounted, said tilt mechanism comprising:

a foot having a first end rotatably connected to the one element and a second end selectively placed in a set position on the surface upon which the element is mounted to thereby place the element in a desired angular position with respect to the surface;

a ratchet integral with said foot;

a tilt block selectively engageable with said ratchet, said tilt block including a pawl that engages teeth formed on said ratchet;

a plunger rod operatively connected to said tilt block for moving said tilt block between a locked and unlocked position, said locked position created by releasing said plunger rod causing said pawl to engage a selected gap between the teeth on said ratchet, said unlocked position created by activating said plunger causing separation of said tilt block from said ratchet thereby releasing said pawl from said ratchet; and a spring placed between a distal surface of said tilt block and an external feature, wherein said spring compresses to bias movement of said tilt block, thereby urging said tilt block to the locked position.

15. A tilt mechanism, as claimed in claim 14, wherein:
said spring is a leaf spring.

16. A tilt mechanism, as claimed in claim 14, wherein:
said spring has a first end abutting said surface of said tilt block, and a second end that abuts said external feature, said spring further including an extension that captures said second end of said spring against said external feature.

17. A tilt mechanism, as claimed in claim 14, wherein:
said spring comprises an elliptical shaped body, and a pair of spaced fingers extending away from said elliptical shaped body, wherein said pair of spaced fingers are inserted within respective slots of said tilt block, and are held in frictional engagement against interior planar edges defined by said respective slots.

18. A tilt mechanism, as claimed in claim 14, wherein:
said spring has a substantially uniform width and thickness.

19. A communication device, comprising:
a housing;
a communication element incorporated in said housing, said communication element comprising at least one of a telephone, a PDA, and a VOIP phone;
a base rotatably mounted to said housing at one end thereof;
a tilt mechanism incorporated in said housing, said tilt mechanism comprising:
(i) a foot having a first end rotatably connected to said housing and a second end selectively placed in a set position within said base to place said housing in a desired angular position with respect to said base;
(ii) a ratchet integral with said foot;
(iii) a tilt block selectively engageable with said ratchet;

a plunger rod operatively connected to said tilt block for moving said tilt block between a locked and unlocked position, said locked position created by releasing said plunger rod causing said tilt block to engage a selected position on said ratchet, said unlocked position created by activating said plunger causing separation of said tilt block from said ratchet thereby releasing said tilt block from said ratchet; and a spring placed between a distal surface of said tilt block and a feature incorporated in said housing, wherein said spring compresses to bias movement of said tilt block, thereby urging said tilt block to the locked position.

20. A method of adjustably positioning a housing of a communication device with respect to a base of the communication device, said method comprising:

providing a housing;

providing a communication element mounted in said housing;

providing a base rotatably connected to said housing;

providing a tilt mechanism mounted in said housing to selectively place the housing at an angled position with respect to said base, said tilt mechanism including a user control to lock and unlock the tilt mechanism;

actuating the user control to place the tilt block in the unlocked position;

biasing the actuating of the user control by a spring associated with said tilt block and said spring being compressed by actuating the user control;

rotating the housing to a desired angular position with respect to the base; and releasing the user control causing the tilt block to move to the locked position and de-compressing said spring, and thereby setting a position of the housing with respect to the base.

* * * * *